US012629714B2

(12) United States Patent
Kim et al.

(10) Patent No.: US 12,629,714 B2
(45) Date of Patent: May 19, 2026

(54) SUBSTRATE TREATING APPARATUS AND SUBSTRATE TREATING METHOD

(71) Applicant: SEMES CO., LTD., Cheonan-si (KR)

(72) Inventors: Yun Sang Kim, Seongnam-si (KR); Yoon Seok Choi, Suwon-si (KR); Young Dae Chung, Incheon (KR); Soon-Cheon Cho, Pyeongtaek-si (KR); Se Hoon Oh, Cheonan-si (KR)

(73) Assignee: Semes Co., LTD., Cheonan-si (KR)

( * ) Notice: Subject to any disclaimer, the term of this patent is extended or adjusted under 35 U.S.C. 154(b) by 774 days.

(21) Appl. No.: 18/060,030

(22) Filed: Nov. 30, 2022

(65) Prior Publication Data

US 2023/0166285 A1 Jun. 1, 2023

(30) Foreign Application Priority Data

Dec. 1, 2021 (KR) ........................ 10-2021-0170352

(51) Int. Cl.

| | |
|---|---|
| ***B05C 5/02*** | (2006.01) |
| ***B05C 13/02*** | (2006.01) |
| ***H05B 6/78*** | (2006.01) |
| ***H05B 6/80*** | (2006.01) |

(52) U.S. Cl.

CPC ................ *B05C 5/02* (2013.01); *B05C 13/02* (2013.01); *H05B 6/78* (2013.01); *H05B 6/80* (2013.01); *H05B 2206/04* (2013.01)

(58) Field of Classification Search

None

See application file for complete search history.

(56) References Cited

U.S. PATENT DOCUMENTS

| | | | | |
|---|---|---|---|---|
| 10,005,092 | B2 * | 6/2018 | Oh | B05B 7/0815 |
| 11,148,150 | B2 * | 10/2021 | Choi | B05B 1/3402 |
| 11,923,213 | B2 | 3/2024 | Kim et al. | |
| 12,278,119 | B2 * | 4/2025 | Cha | H01L 21/67034 |
| 2013/0255728 | A1 * | 10/2013 | Noh | B05B 13/02 134/26 |
| 2014/0319129 | A1 | 10/2014 | Ahmad | |
| 2015/0034702 | A1 * | 2/2015 | Zhang | H01L 24/742 228/176 |
| 2016/0118241 | A1 * | 4/2016 | Lee | H01L 21/67051 134/33 |
| 2017/0372922 | A1 * | 12/2017 | Jung | H01L 21/68728 |
| 2019/0096737 | A1 * | 3/2019 | Abe | H01L 21/67017 |

(Continued)

FOREIGN PATENT DOCUMENTS

| | | |
|---|---|---|
| CN | 113053777 B | 8/2024 |
| JP | H04-357836 A | 12/1992 |

(Continued)

*Primary Examiner* — Jethro M. Pence

(74) *Attorney, Agent, or Firm* — Harness, Dickey & Pierce, P.L.C.

(57) ABSTRACT

Provided are a substrate treating apparatus and a substrate treating method. The substrate treating apparatus includes: a chamber for providing a processing space; a substrate support unit provided in the processing space to support a substrate and rotate the substrate; a liquid supply unit including a chemical liquid discharge nozzle that discharges a chemical liquid to the substrate supported by the substrate support unit; and a microwave applying member for emitting microwaves to the substrate.

10 Claims, 8 Drawing Sheets

(56) References Cited

U.S. PATENT DOCUMENTS

| | | | | |
|---|---|---|---|---|
| 2019/0362993 | A1* | 11/2019 | Jeon | B08B 3/024 |
| 2019/0368044 | A1* | 12/2019 | Grill | C23C 16/274 |
| 2021/0118701 | A1 | 4/2021 | Chung et al. | |
| 2022/0406571 | A1* | 12/2022 | Choi | H01J 37/32449 |
| 2023/0166285 | A1* | 6/2023 | Kim | B05C 13/02 118/300 |
| 2023/0197471 | A1* | 6/2023 | Son | H01L 21/67051 |
| 2023/0207271 | A1* | 6/2023 | Choi | H01J 37/3244 156/345.41 |
| 2023/0369021 | A1* | 11/2023 | Choi | H01J 37/32192 |
| 2025/0174471 | A1* | 5/2025 | Park | H01L 21/6708 |

FOREIGN PATENT DOCUMENTS

| | | | |
|---|---|---|---|
| JP | 2010-219003 | A | 9/2010 |
| JP | 2015-053333 | A | 3/2015 |
| JP | 2017-183446 | A | 10/2017 |
| JP | 2021-007148 | A | 1/2021 |
| JP | 7311096 | B2 | 7/2023 |
| JP | 7484057 | B2 | 5/2024 |
| KR | 10-2001-0027577 | A | 4/2001 |
| KR | 10-2164262 | | 10/2020 |
| KR | 10-2021-0083092 | A | 7/2021 |

* cited by examiner

SUBSTRATE TREATING APPARATUS AND SUBSTRATE TREATING METHOD

CROSS-REFERENCE TO RELATED APPLICATIONS

This application claims priority to and the benefit of Korean Patent Application No. 10-2021-0170352 filed in the Korean Intellectual Property Office on Dec. 1, 2021, the entire contents of which are incorporated herein by reference.

TECHNICAL FIELD

The present invention relates to a substrate treating apparatus and a substrate treating method.

BACKGROUND ART

In order to manufacture a semiconductor device or a liquid crystal display, various processes, such as photography, ashing, ion implantation, thin film deposition, and cleaning, are performed on a substrate. Among them, the etching process or the cleaning process is a process for removing unnecessary regions from a thin film formed on a substrate, and high selectivity for the thin film, high etch rate, and etch uniformity are required, and higher levels of etch selectivity and etch uniformity are required as semiconductor devices are highly integrated.

In general, in the etching process or cleaning process of the substrate, a chemical treatment operation, a rinse treatment operation, and a drying treatment operation are sequentially performed. In the chemical treatment operation, a chemical for etching the thin film formed on the substrate or removing foreign substances on the substrate is supplied to the substrate, and in the rinse treatment operation, a rinse solution, such as pure water, is supplied onto the substrate. As such, processing of the substrate through the fluid may be accompanied by heating of the substrate.

SUMMARY OF THE INVENTION

The present invention has been made in an effort to provide a substrate treating apparatus capable of efficiently treating a substrate.

The present invention has also been made in an effort to provide a substrate treating apparatus capable of improving etching performance.

The present invention has also been made in an effort to provide a substrate treating apparatus capable of precisely controlling a temperature of a substrate by rapidly increasing a temperature of a substrate.

The present invention has also been made in an effort to provide a substrate treating apparatus capable of selectively heating according to a film quality of a substrate.

The present invention has also been made in an effort to provide a substrate treating apparatus capable of minimizing damage to a substrate caused by heating the substrate.

The object of the present invention is not limited thereto, and other objects not mentioned will be clearly understood by those of ordinary skill in the art from the following description.

An exemplary embodiment of the present invention provides an apparatus for treating a substrate, the apparatus including: a chamber for providing a processing space; a substrate support unit provided in the processing space to support a substrate and rotate the substrate; a liquid supply unit including a chemical liquid discharge nozzle that discharges a chemical liquid to the substrate supported by the substrate support unit; and a microwave applying member for emitting microwaves to the substrate.

In the exemplary embodiment, the substrate support unit may include: a window member provided in a material through which a laser beam emitted from a laser beam emitting unit is transmittable, and provided under the substrate; a chuck pin for supporting a side portion of the substrate and making the window member and the substrate be spaced apart from each other at a predetermined internal; a spin housing which is coupled to the window member and is penetrated in a vertical direction to provide a path through which the laser beam is transmitted; and a driving member for rotating the spin housing, and the microwave applying member is provided under the window member.

In the exemplary embodiment, the apparatus may further include a back nozzle provided through the window member inside the spin housing.

In the exemplary embodiment, the back nozzle may be provided as a dielectric.

In the exemplary embodiment, the microwave applying member may emit a first microwave and a second microwave different from the first microwave.

In the exemplary embodiment, the first microwave and the second microwave may be different in any one or more of a pulse width, intensity, and a duty ratio.

In the exemplary embodiment, the microwave may be provided differently depending on the type of film quality.

In the exemplary embodiment, the second microwave may offset an overlapping phenomenon of a traveling wave that the first microwave reaches to the substrate and a reflected wave.

In the exemplary embodiment, the microwave applying member may be provided under the substrate.

In the exemplary embodiment, the chemical liquid may be an aqueous solution of phosphoric acids.

In the exemplary embodiment, the apparatus may further include a controller, in which the controller may control the substrate support unit and the liquid supply unit to form a liquid film of the chemical liquid on an upper surface of the substrate while rotating the substrate, and apply the microwave to the substrate through the microwave applying member.

Another exemplary embodiment of the present invention provides a method of treating a substrate, the method including: applying a microwave to a substrate formed with a liquid film by a chemical liquid and heating the substrate.

In the exemplary embodiment, the substrate may be provided while being supported by a substrate support unit which supports the substrate and is rotatable, and the microwave applying member applying the microwave may be provided under the substrate.

In the exemplary embodiment, the chemical liquid may be an aqueous solution of phosphoric acids.

In the exemplary embodiment, the microwave may be provided differently depending on the type of film quality.

In the exemplary embodiment, the microwave may be overlapping of a first microwave and a second microwave different from the first microwave.

In the exemplary embodiment, the first microwave and the second microwave may be different in any one or more of a pulse width, intensity, and a duty ratio.

In the exemplary embodiment, the second microwave may offset an overlapping phenomenon of a traveling wave that the first microwave reaches to the substrate and a reflected wave.

In the exemplary embodiment, the microwave may be transmitted to the substrate through a tube body through which a fluid treating a lower portion of the substrate flows.

In the exemplary embodiment, in the substrate, a thickness of a membrane to be treated may be a first thickness, when the first thickness is greater than a set thickness, a first microwave may be applied, when the first thickness is smaller than the set thickness, a second microwave may be applied, and the first microwave may have a higher frequency than the second microwave.

Still another exemplary embodiment of the present invention provides an apparatus for treating a substrate, the apparatus including: a chamber for providing a processing space; a substrate support unit provided in the processing space to support a substrate and rotate the substrate; a liquid supply unit including a chemical liquid discharge nozzle that discharges a chemical liquid to the substrate supported by the substrate support unit; and a microwave applying member for emitting microwaves to the substrate, in which the substrate support unit includes: a window member provided in a material through which a laser beam emitted from a laser beam emitting unit is transmittable, provided under the substrate, and made of a dielectric material; a chuck pin for supporting a side portion of the substrate and making the window member and the substrate be spaced apart from each other at a predetermined internal; a spin housing which is coupled to the window member and is penetrated in a vertical direction to provide a path through which the laser beam is transmitted; and a driving member for rotating the spin housing, the microwave applying member is provided under the window member, and the microwave is provided differently depending on the type of membrane quality.

According to the exemplary embodiment of the present invention, it is possible to efficiently treat a substrate.

According to the exemplary embodiment of the present invention, etch performance may be improved.

According to the exemplary embodiment of the present invention, the temperature of the substrate is rapidly increased (600° C./s or higher) to precisely control the temperature of the substrate.

According to the exemplary embodiment of the present invention, it is possible to provide a substrate treating apparatus capable of selectively heating according to the film quality of a substrate.

According to the exemplary embodiment of the present invention, it is possible to provide a substrate treating apparatus capable of minimizing damage to the substrate due to heating the substrate.

The effect of the present invention is not limited to the foregoing effects, and those skilled in the art may clearly understand non-mentioned effects from the present specification and the accompanying drawings.

DETAILED DESCRIPTION

Figure 1:
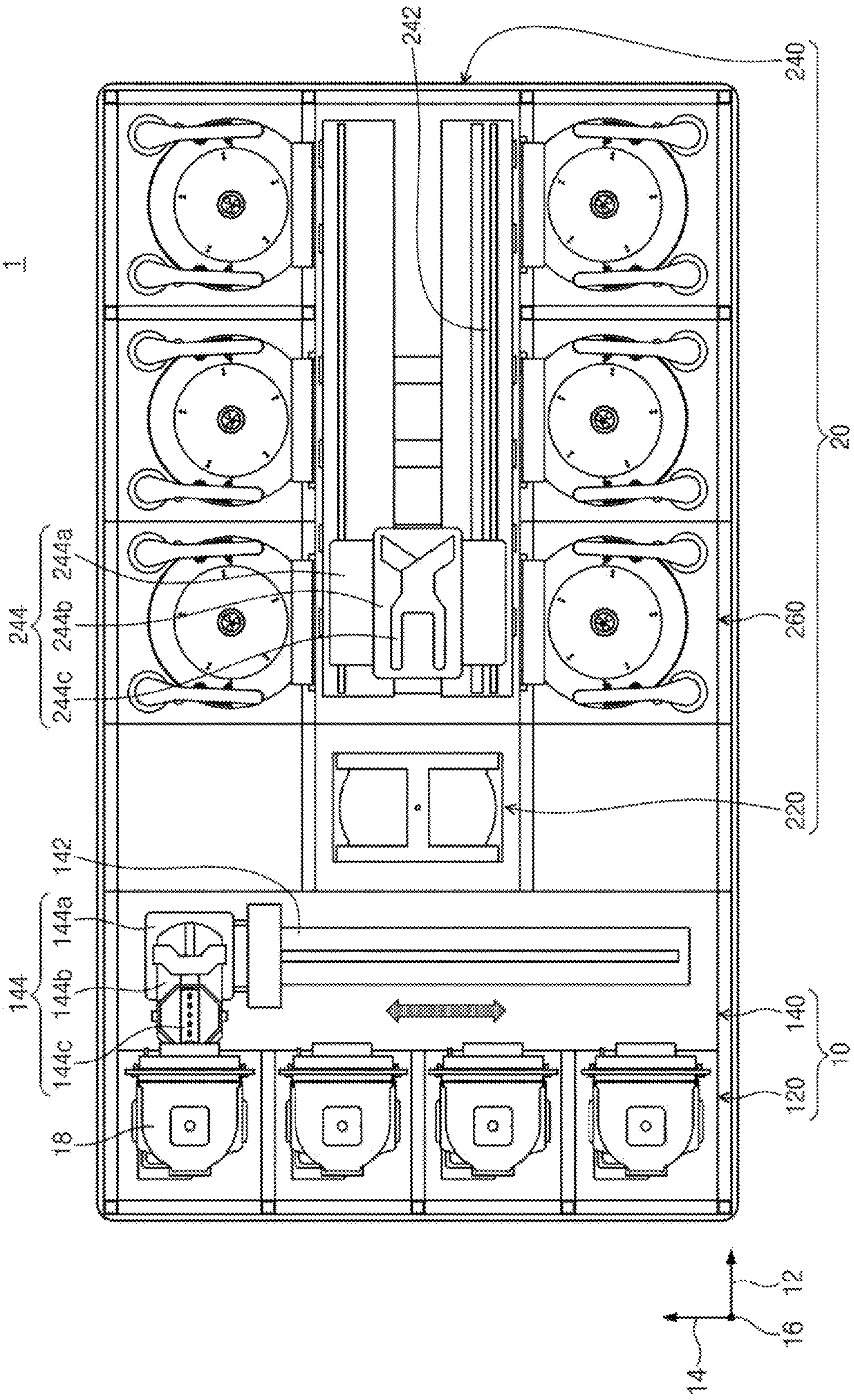
FIG. 1 is a top plan view illustrating a substrate treating facility 1 according to an exemplary embodiment of the present invention.

Hereinafter, an exemplary embodiment of the present invention will be described more fully hereinafter with reference to the accompanying drawings, in which exemplary embodiments of the invention are illustrated. However, the present invention can be variously implemented and is not limited to the following exemplary embodiments. In addition, in describing an exemplary embodiment of the present invention in detail, if it is determined that a detailed description of a related well-known function or configuration may unnecessarily obscure the gist of the present invention, the detailed description thereof will be omitted. In addition, the same reference numerals are used throughout the drawings for parts having similar functions and actions.

In addition, unless explicitly described to the contrary, the word "comprise" and variations such as "comprises" or "comprising" will be understood to imply the inclusion of stated elements but not the exclusion of any other elements. It will be appreciated that terms "including" and "having" are intended to designate the existence of characteristics, numbers, operations, operations, constituent elements, and components described in the specification or a combination thereof, and do not exclude a possibility of the existence or addition of one or more other characteristics, numbers, operations, operations, constituent elements, and components, or a combination thereof in advance.

Singular expressions used herein include plurals expressions unless they have definitely opposite meanings in the context. Accordingly, shapes, sizes, and the like of the elements in the drawing may be exaggerated for clearer description.

An expression, "and/or" includes each of the mentioned items and all of the combinations including one or more of the items. Further, in the present specification, "connected" means not only when member A and member B are directly connected, but also when member A and member B are indirectly connected by interposing member C between member A and member B.

The exemplary embodiment of the present invention may be modified in various forms, and the scope of the present invention should not be construed as being limited to the following exemplary embodiments. The present exemplary embodiment is provided to more completely explain the present invention to those skilled in the art. Therefore, the shapes of elements in the drawings are exaggerated to emphasize clearer descriptions.

FIG. 1 is a top plan view illustrating a substrate treating facility 1 according to an exemplary embodiment of the present invention. Referring to FIG. 1, the substrate treating facility 1 includes an index module 10 and a process processing module 20. The index module 10 includes a load port 120 and a transfer frame 140. The load port 120, the transfer frame 140, and the process processing module 20 may be sequentially arranged in series.

Hereinafter, a direction in which the load port 120, the transfer frame 140, and the process processing module 20 are arranged is called a first direction 12, a direction perpendicular to the first direction 12 when viewed from the top is called a second direction 14, and a direction perpendicular to a plane including the first direction 12 and the second direction 14 is called a third direction 16.

A carrier 18 in which a substrate W is accommodated is seated on the load port 120. A plurality of load ports 120 is provided, and is disposed in series in the second direction 14. The number of load ports 120 may be increased or decreased according to process efficiency of the process processing module 20 and a condition of foot print, and the like. A plurality of slots (not illustrated) for accommodating the plurality of substrates W in a state where the substrates W are arranged horizontally with respect to the ground may be formed in the carrier 18. As the carrier 18, a Front Opening Unified Pod (FOUP) may be used.

The process processing module 20 includes a buffer unit 220, a transfer chamber 240, and a process chamber 260.

The transfer chamber 240 is disposed so that a longitudinal direction thereof is parallel to the first direction 12. The plurality of process chambers 260 may be disposed at one side or both sides of the transfer chamber 240. The plurality of process chambers 260 may be provided to be symmetric based on the transfer chamber 240 at one side and the other side of the transfer chamber 240. Some of the process chambers 260 are disposed in the longitudinal direction of the transfer chamber 240. Further, some of the process chambers 260 are disposed to be stacked with each other. That is, the plurality of process chambers 260 may be disposed in an array of A×B at one side of the transfer chamber 240. Herein, A is the number of process chambers 260 provided in series in the first direction 12, and B is the number of process chambers 260 provided in series in the third direction 16. When four or six process chambers 260 are provided at one side of the transfer chamber 240, the plurality of process chambers 260 may be disposed in an array of 2×2 or 3×2. The number of process chambers 260 may be increased or decreased. Unlike the above, the process chambers 260 may be provided only to one side of the transfer chamber 240. Further, the process chambers 260 may be provided in a single layer at one side and both sides of the transfer chamber 240.

The buffer unit 220 is disposed between the transfer frame 140 and the transfer chamber 240. The buffer unit 220 provides a space in which the substrate W stays before the substrate W is transferred between the transfer chamber 2400 and the transfer frame 140. Slots (not illustrated) on which the substrate W is placed is provided inside the buffer unit 220. The plurality of slots (not illustrated) is provided so as to be spaced apart from each other in the third direction 16. A surface of the buffer unit 220 facing the transfer frame 140 and a surface of the buffer unit 220 facing the transfer chamber 240 are opened.

The transfer frame 140 transfers the substrate W between the carrier 130 seated on the load port 120 and the buffer unit 220. An index rail 142 and an index robot 144 are provided to the transfer frame 140. The index rail 142 is provided so that a longitudinal direction thereof is parallel to the second direction 14. The index robot 144 is installed on the index rail 142, and linearly moves in the second direction 14 along the index rail 142. The index robot 144 includes a base 144*a*, a body 144*b*, and an index arm 144*c*. The base 144*a* is installed to be movable along the index rail 142. The body 144*b* is coupled to the base 144*a*. The body 144*b* is provided to be movable in the third direction 16 on the base 144*a*. Further, the body 144*b* is provided to be rotatable on the base 144*a*. The index arm 144*c* is coupled to the body 144*b* and is provided to be movable forwardly and backwardly with respect to the body 144*b*. A plurality of index arms 144*c* is provided to be individually driven. The index arms 144*c* are disposed to be stacked in the state of being spaced apart from each other in the third direction 16. A part of the index arms 144*c* may be used when the substrate W is transferred from the process processing module 20 to the carrier 18, and another part of the plurality of index arms 144*c* may be used when the substrate W is transferred from the carrier 18 to the process processing module 20. This may prevent the particles generated from the substrate W before the process processing from being attached to the substrate W after the process processing in the process in which the index robot 144 loads and unloads the substrate W.

The transfer chamber 240 transfers the substrate W between the buffer unit 220 and the process chamber 260, and between the process chambers 260. A guide rail 242 and a main robot 244 are provided to the transfer chamber 240. The guide rail 242 is disposed so that a longitudinal direction thereof is parallel to the first direction 12. The main robot 244 is installed on the guide rail 242, and linearly moves on the guide rail 242 in the first direction 12. The main robot 244 includes a base 244*a*, a body 244*b*, and a main arm 244*c*. The base 244*a* is installed to be movable along the guide rail 242. The body 244*b* is coupled to the base 244*a*. The body 244*b* is provided to be movable in the third direction 16 on the base 244*a*. Further, the body 244*b* is provided to be rotatable on the base 244*a*. The main arm 244*c* is coupled to the body 244*b*, and provided to be movable forwardly and backwardly with respect to the body 244*b*. A plurality of main arms 244*c* is provided to be individually driven. The main arms 244 are disposed to be stacked in the state of being spaced apart from each other in the third direction 16.

A substrate treating apparatus 300 performing a liquid processing process on the substrate W is provided to the process chamber 260. The substrate treating apparatus 300 may have a different structure depending on the type of liquid processing process to be performed. Contrary to this, the substrate treating apparatus 300 within each process chamber 260 may have the same structure. Optionally, the plurality of process chambers 260 is divided into a plurality of groups, and the substrate treating apparatuses 300 within the process chambers 260 belong to the same group may have the same structure, and the substrate treating apparatuses 300 within the process chambers 260 belong to the different groups may have the different structures.

Figure 2:
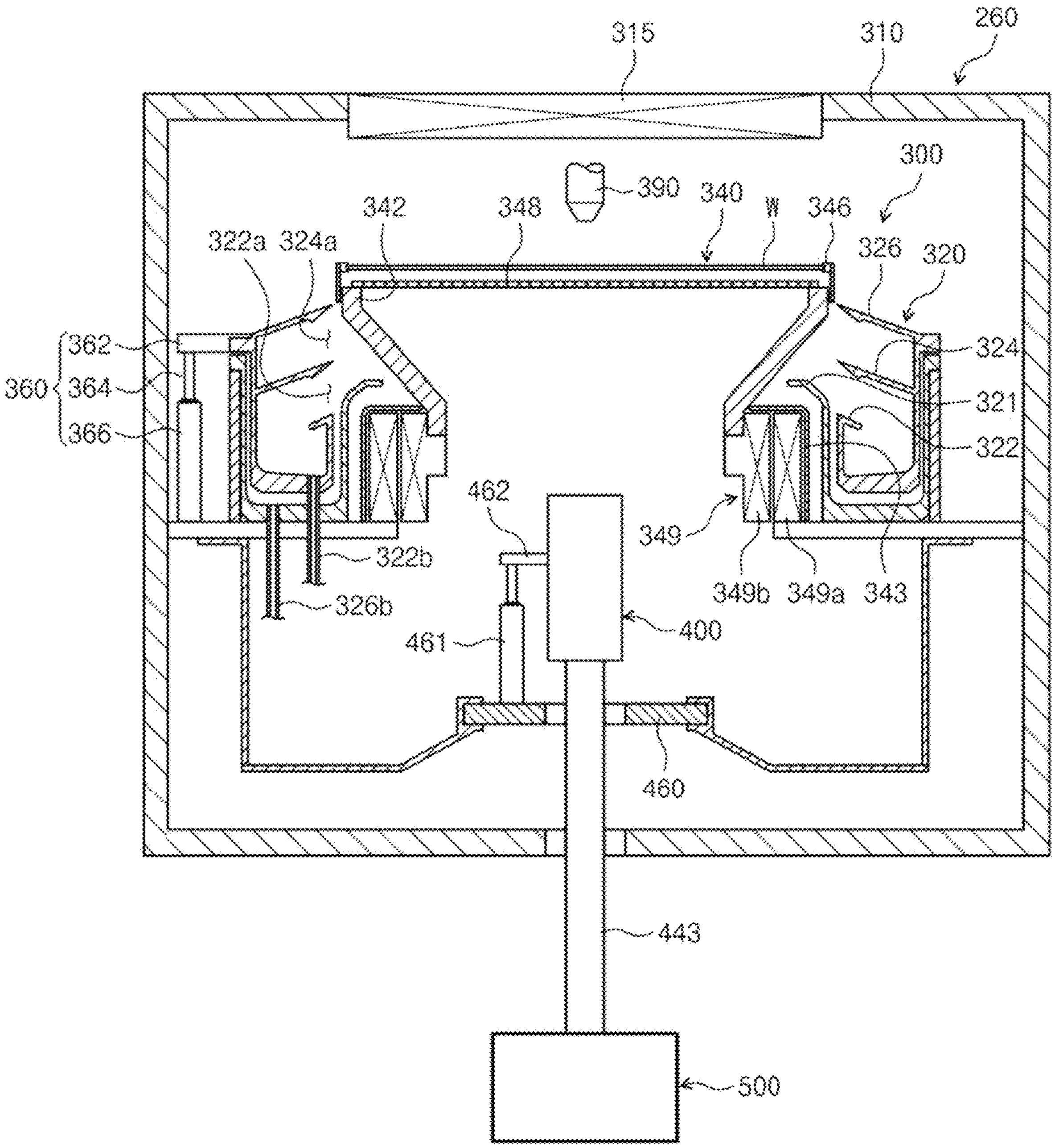
FIG. 2 is a cross-sectional view illustrating a substrate treating apparatus 300 according to a first exemplary embodiment provided to a process chamber 260 of FIG. 1.

FIG. 2 is a cross-sectional view illustrating a substrate treating apparatus 300 according to a first exemplary embodiment provided to the process chamber 260 of FIG. 1. Referring to FIG. 2, the substrate treating apparatus 300 includes a processing vessel 320, a substrate support unit 340, a lifting unit 360, a liquid supply unit 390, and a controller (not illustrated).

The processing vessel 320 has a cylindrical shape with an open top. The processing vessel 320 includes a first collection container 321 and a second collection container 322. The collection containers 321 and 322 recovers different processing liquids among the processing liquids used for the process. The first collection container 321 is provided in an annular ring shape surrounding the substrate support unit 340. The second collection container 322 is provided in an annular ring shape surrounding the substrate support unit 340. In the exemplary embodiment, the first collection container 321 is provided in an annular ring shape surrounding the second collection container 322. The second collection container 322 may be provided while being inserted into the first collection container 321. A height of the second collection container 322 may be larger than a height of the first collection container 321. The second collection container 322 may include a first guard part 326 and a second guard part 324. The first guard part 326 may be provided to the topmost portion of the second collection container 322. The first guard part 326 is formed while being extended toward the substrate support unit 340, and the first guard part 326 may be formed to be inclined upward toward the substrate support unit 340. In the second collection container 322, the second guard part 324 may be provided to a position spaced apart from the first guard part 326 in the down direction. The second guard part 324 is formed while being extended toward the substrate support unit 340, and the second guard part 326 may be formed to be inclined upward toward the substrate support unit 340. A first inlet 324*a* through which a treatment liquid is introduced is provided between the first guard part 326 and the second guard part 324. A second inlet 322*a* is provided in a lower portion of the second guard part 324. The first inlet 324*a* and the second inlet 322*a* may be located at different heights. A hole (not illustrated) is formed in the second guard part 324, so that the treatment liquid introduced through the first inlet 324*a* flows to a second collection line 322*b* provided in the lower portion of the second collection container 322. The hole (not illustrated) of the second guard part 324 may be formed at a position with the lowest height in the second guard part 324. The treatment liquid collected to the first collection container 321 is configured to flow to a first collection line 321*b* connected to a bottom surface of the first collection container 321. The processing liquids introduced into the recovery containers 321 and 322 may be provided to an external processing liquid recycling system (not illustrated) through the recovery lines 321*b* and 322*b*, respectively, to be re-used.

The lift unit 360 linearly moves the treating vessel 320 in the vertical direction. As an example, the lifting unit 360 is coupled to the second collection container 322 of the processing vessel 320 and moves the second collection container 322 up and down, so that a relative height of the processing container 320 with respect to the substrate support unit 340 may be changed. The lifting unit 360 includes a bracket 362, a movement shaft 364, and a driver 366. The bracket 362 is fixedly installed to an external wall of the treating vessel 320, and the movement shaft 364 moved in the vertical direction by the driver 366 is fixedly coupled to the bracket 362. The second collection container 322 of the treating vessel 320 moves down so that an upper portion of the substrate support unit 340 protrudes above the treating vessel 320 when the substrate W is loaded into the substrate support unit 340 or is unloaded from the substrate support unit 340. Further, when the process proceeds, the height of the treating vessel 320 is adjusted so that the processing liquid is introduced into the predetermined recovery container 321 and 322 depending on the type of the processing liquid supplied to the substrate W. Optionally, the lift unit 360 may also move the substrate support unit 340 in the vertical direction instead of the treating vessel 320. Optionally, the lift unit 360 may also move the entire treatment vessel 320 to be movable up and down in the vertical direction. The lifting unit 360 is provided to adjust the relative height of the processing vessel 320 and the substrate support unit 340, and if the lifting unit 360 has a configuration capable of adjusting the relative heights of the processing vessel 320 and the substrate support unit 340, embodiments of the processing vessel 320 and the lifting unit 360 may be provided in various structures and methods according to designs.

The substrate support unit 340 supports the substrate W and rotates the substrate W during the process progress.

The substrate support unit 340 includes a window member 348, a spin housing 342, a chuck pin 346, and a driving member 349.

The window member 348 is located under the substrate W. The window member 348 may be provided in a shape substantially corresponding to the substrate W. For example, when the substrate W is a circular wafer, the window member 348 may be provided in a substantially circular shape. The window member 348 may have the same diameter as that of the substrate W, have a smaller diameter than that of the substrate W, or have a larger diameter than that of the substrate W. The window member 348 is a configuration that allows the laser beam to pass through and reaches the substrate W, and protects the configuration of the substrate support member 340 from a chemical liquid, and may be provided in various sizes and shapes according to design. The support member 113 may be formed of a larger diameter than the diameter of the wafer.

The window member 348 may be made of a material having high microwave permeability. Accordingly, microwaves emitted from the microwave applying member 400 may pass through the window member 348. The window member 348 may be made of a material having excellent corrosion resistance so as not to react with the chemical liquid. For this purpose, the material of the window member 348 may be, for example, quartz, glass, or sapphire.

The spin housing 342 may be provided on the bottom surface of the window member 349. The spin housing 342 supports an edge of the window member 349. The spin housing 342 provides an empty space penetrated in the vertical direction therein. The empty space formed by the spin housing 342 may have an inner diameter increasing toward the window member 349 from the portion adjacent to the microwave applying member 400. The spin housing 342 may have a cylindrical shape in which an inner diameter increases from the bottom to the top. It is sufficient if the spin housing 342 has a structure in which microwaves emitted from the microwave applying member 400, which will be described later, are transmitted to the substrate W to heat the substrate W to a desired temperature.

The driving member 349 may be coupled to the spin housing 342 to rotate the spin housing 342. The driving member 349 may be any one capable of rotating the spin housing 342. For example, the driving member 349 may be provided in a hollow motor. According to the exemplary embodiment, the driving member 349 includes a stator 349*a* and a rotator 349*b*. The stator 349*a* is fixed at one position, and the rotator 349*b* is coupled to the spin housing 342. According to the illustrated exemplary embodiment, the hollow motor in which the rotator 349*b* is provided to an inner diameter and the stator 349*a* is provided to an outer diameter is illustrated. According to the illustrated example, the lower portion of the spin housing 349 is coupled to the rotator 349*b* to be rotated by the rotation of the rotator 349*b*. When the hollow motor is used as the driving member 349, the narrower the bottom of the spin housing 349 is provided, the smaller the hollow of the hollow motor may be selected, and thus the manufacturing cost may be reduced. According to the embodiment, the stator 349*a* of the driving member 349 may be provided by being fixedly coupled to a support surface on which the processing vessel 320 is supported. According to the exemplary embodiment, a cover member 343 protecting the driving member 349 from the chemical liquid may be further included.

The liquid supply unit 349 is the configuration for discharging the chemical liquid to the substrate W above the substrate W, and may include one or more chemical liquid discharge nozzles. The liquid supply unit 390 may pump and transfer the chemical liquid stored in a storage tank (not illustrated) to discharge the chemical liquid to the substrate W through the chemical liquid discharge nozzle. The liquid supply unit 390 may include a driving unit to be movable between a process position directly above the center of the substrate W and a standby position outside the substrate W.

The chemical liquid supplied from the liquid supply unit 390 to the substrate W may be various depending on the substrate treatment process. When the substrate treatment process is a silicon nitride film etching process, the chemical liquid may be a chemical liquid including phosphoric acid ($H_3PO_4$). The liquid supply unit 390 may further include a deionized water (DIW) supply nozzle for rinsing the surface of the substrate after the etching process, and an isopropyl alcohol (IPA) discharge nozzle and a nitrogen ($N_2$) discharge nozzle for performing a drying process after rinsing. Although not illustrated, the liquid supply unit 390 may include a nozzle moving member (not illustrated) which is capable of supporting the chemical liquid discharge nozzle and moving the chemical liquid discharge nozzle. The nozzle moving member (not illustrated) may include a support shaft (not illustrated), an arm (not illustrated), and a driver (not illustrated). The support shaft (not illustrated) is located at one side of the treating vessel 320. The support shaft (not illustrated) includes a rod shape of which a longitudinal direction faces the third direction. The support shaft (not illustrated) is provided to be rotatable by the driver (not illustrated). The arm (not illustrated) is coupled to an upper end of the support shaft (not illustrated). The arm (not illustrated) may be extended vertically from the support shaft (not illustrated). The chemical liquid discharge nozzle is fixedly coupled to the distal end of the arm (not illustrated). According to the rotation of the support shaft (not illustrated), the chemical liquid discharge nozzle is capable of swing together with the arm (not illustrated). The chemical liquid discharge nozzle may be swing-moved to move to the process position and the standby position. Optionally, the support shaft (not illustrated) may be provided to be movable up and down. Further, the arm (not illustrated) may be provided to be movable forward and backward toward the longitudinal direction thereof.

The microwave applying member 400 emits the received microwaves. The microwaves are emitted to the substrate W. The substrate W to which the microwaves are applied is heated. (Describe specific characteristics (frequency, power, duty ratio, and the like) of the microwaves applied to obtain 600° C./s or higher.) According to the embodiment, a heating rate of the substrate by microwaves is 600° C./s or higher.

The microwave applying member 400 is connected to a magnetron 500 which generates microwaves through a waveguide 443. The magnetron 500 corresponds to a microwave source in the embodiment of the present invention. The waveguide 443 transmits microwaves to the microwave applying member 400. A tuner 430 may be installed in the microwave transmission path of the waveguide 443. The tuner 430 performs a function of matching impedance. Impedance matching by the tuner 430 may be performed based on the detection result of the reflected wave by a detector (not illustrated).

The microwave applying member 400 includes a microwave introduction port 411 and a transmission window 415. The transmission window 415 is provided at the end of the microwave introduction port 411 to block the microwave introduction port 411. The transmission window 415 is formed of a dielectric material. For example, as a material of the transmission window 415, quartz, ceramic, or the like may be used. The inside of the microwave application member 400 may be sealed by the coupling of the transmission window 415 and the microwave introduction port 411.

Figure 5:
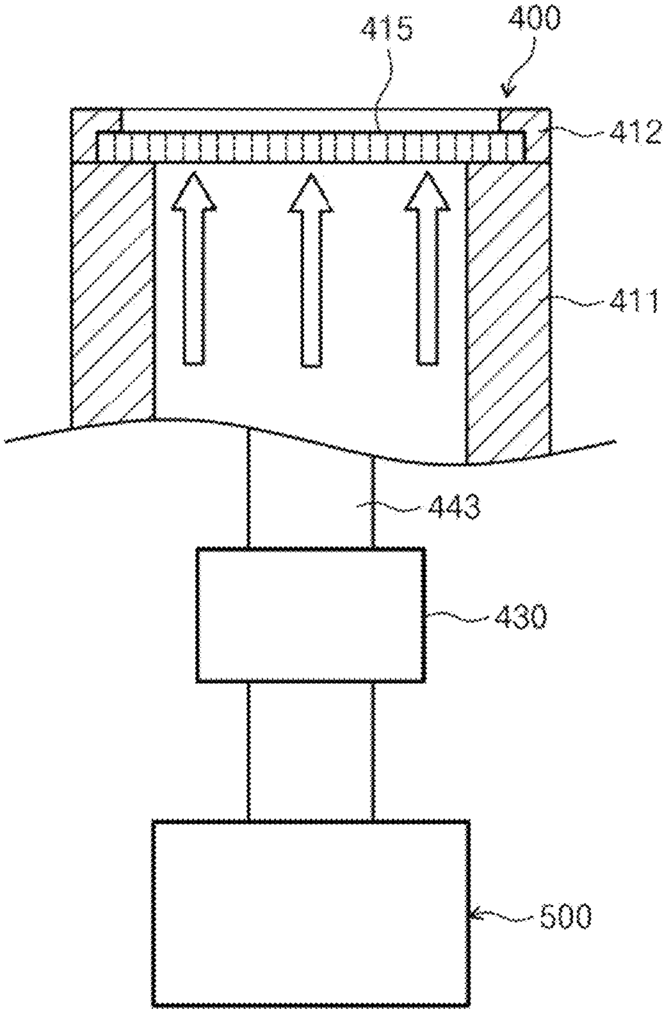
FIG. 5 is a cross-sectional view illustrating a structure to which a transmission window of a microwave applying member 400 according to the first embodiment of the present invention is applied.

An upper portion of the transmission window 415 may be covered by a cover member 412. The inner diameter of the cover member 412 is smaller than the diameter of the transmission window 415, but is provided larger than the inner diameter of the microwave introduction port 411, so that it is possible to remove a phenomenon in which microwaves are reflected by the cover member 412 (see FIG. 5).

In this example, the magnetron 500 is installed outside the process chamber 260, but the magnetron 500 may also be installed inside the process chamber 260. When the magnetron 500 is installed inside the process chamber, it is considered that the process effect by heating generated by the operation of the magnetron 500 should be considered.

The controller (not illustrated) may control the substrate treating apparatus. The controller (not illustrated) may control components of the substrate treating system to treat a substrate according to a set process. Further, the controller (not illustrated) may include a process controller formed of a microprocessor (computer) that executes the control of the substrate treating apparatus, a user interface formed of a keyboard in which an operator performs a command input operation or the like in order to manage the substrate treating apparatus, a display for visualizing and displaying an operation situation of the substrate treating apparatus, and the like, and a storage unit storing a control program for executing the process executed in the substrate treating apparatus under the control of the process controller or a program, that is, a treatment recipe, for executing the process in each component according to various data and processing conditions. Further, the user interface and the storage unit may be connected to the process controller. The treatment recipe may be stored in a storage medium in the storage unit, and the storage medium may be a hard disk, and may also be a portable disk, such as a CD-ROM or a DVD, or a semiconductor memory, such as a flash memory.

Figure 3:
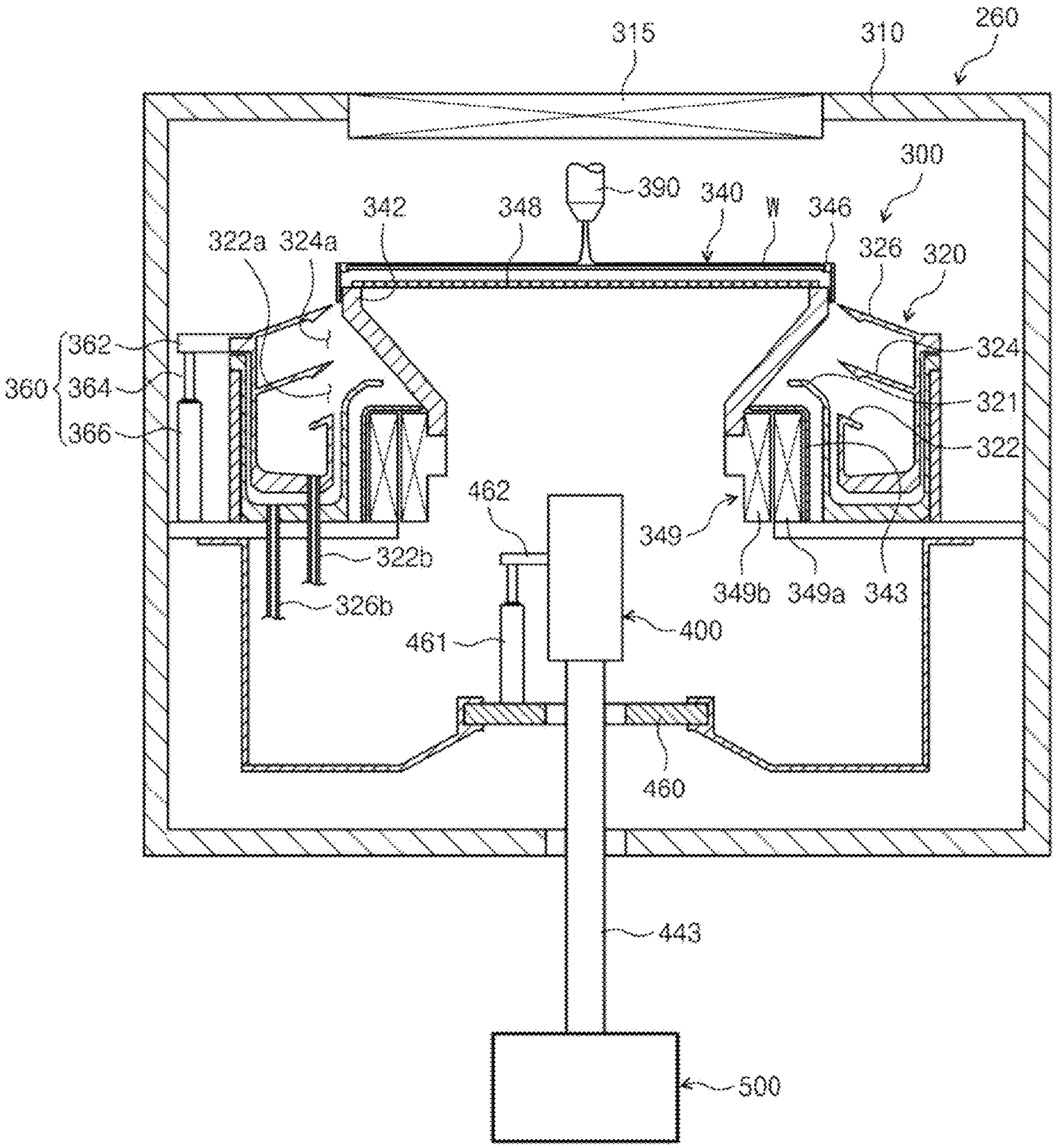
FIGS. 3 and 4 are diagrams sequentially illustrating a method of operating the substrate treating apparatus according to the first embodiment of the present invention.
Figure 4:
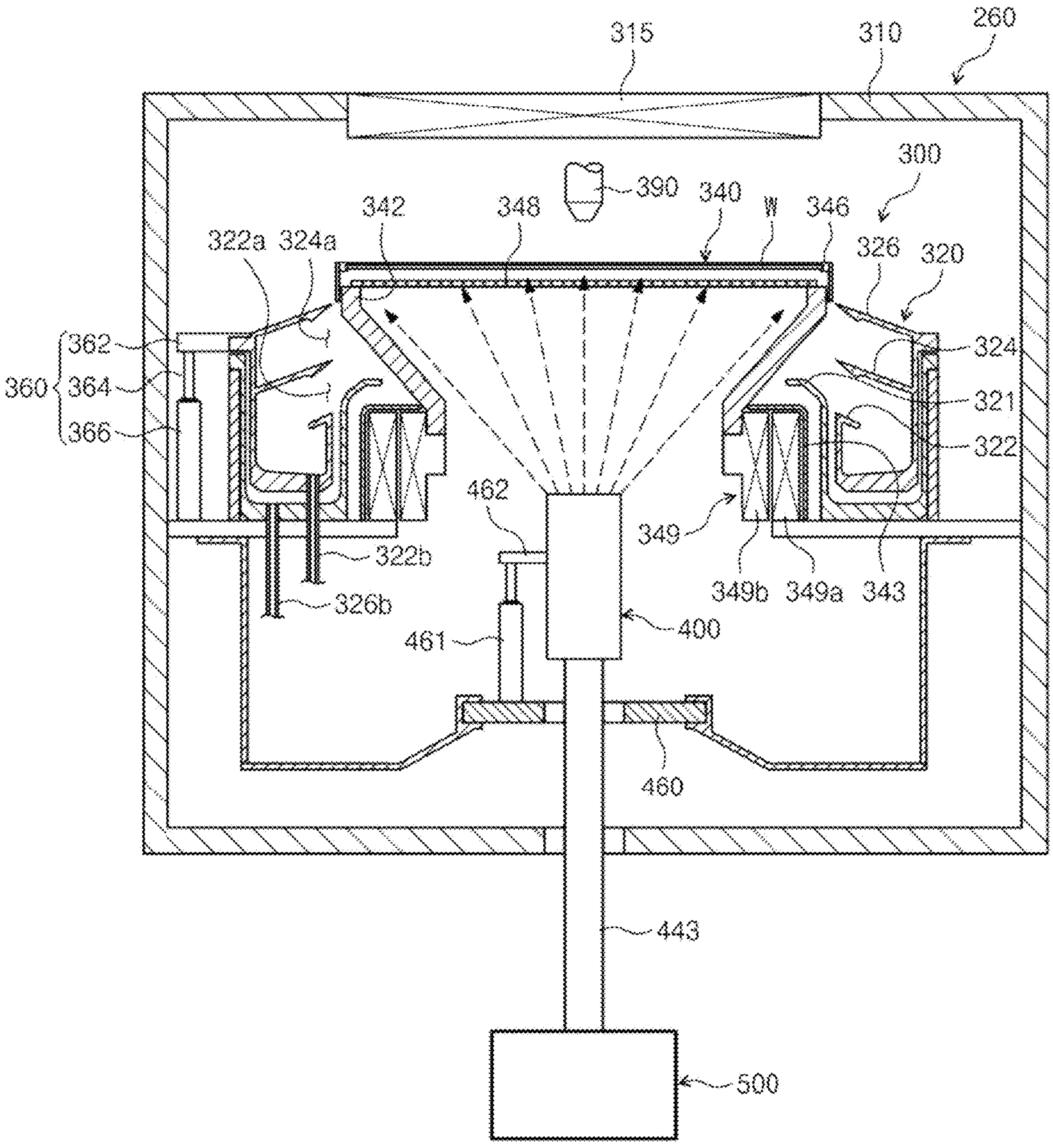

FIGS. 3 and 4 are diagrams sequentially illustrating a method of operating the substrate treating apparatus according to the first embodiment of the present invention.

FIGS. 3 and 4 are sequentially referred to. The substrate W is supported on the substrate support unit 300 by the chuck pins 346. According to the driving of the driving member 349, the substrate W is rotated, and the liquid supply unit 390 supplies the chemical solution onto the rotated substrate W. Power is supplied to the magnetron 500 so that the microwave applying unit 400 emits microwaves toward the substrate W. The substrate W is heated by the microwaves. As the substrate W is heated, the chemical liquid reacts with the substrate W and the substrate is treated. The treatment of the substrate W by the chemical liquid may be an etching treatment. The chemical liquid may be phosphoric acid.

Figure 6:
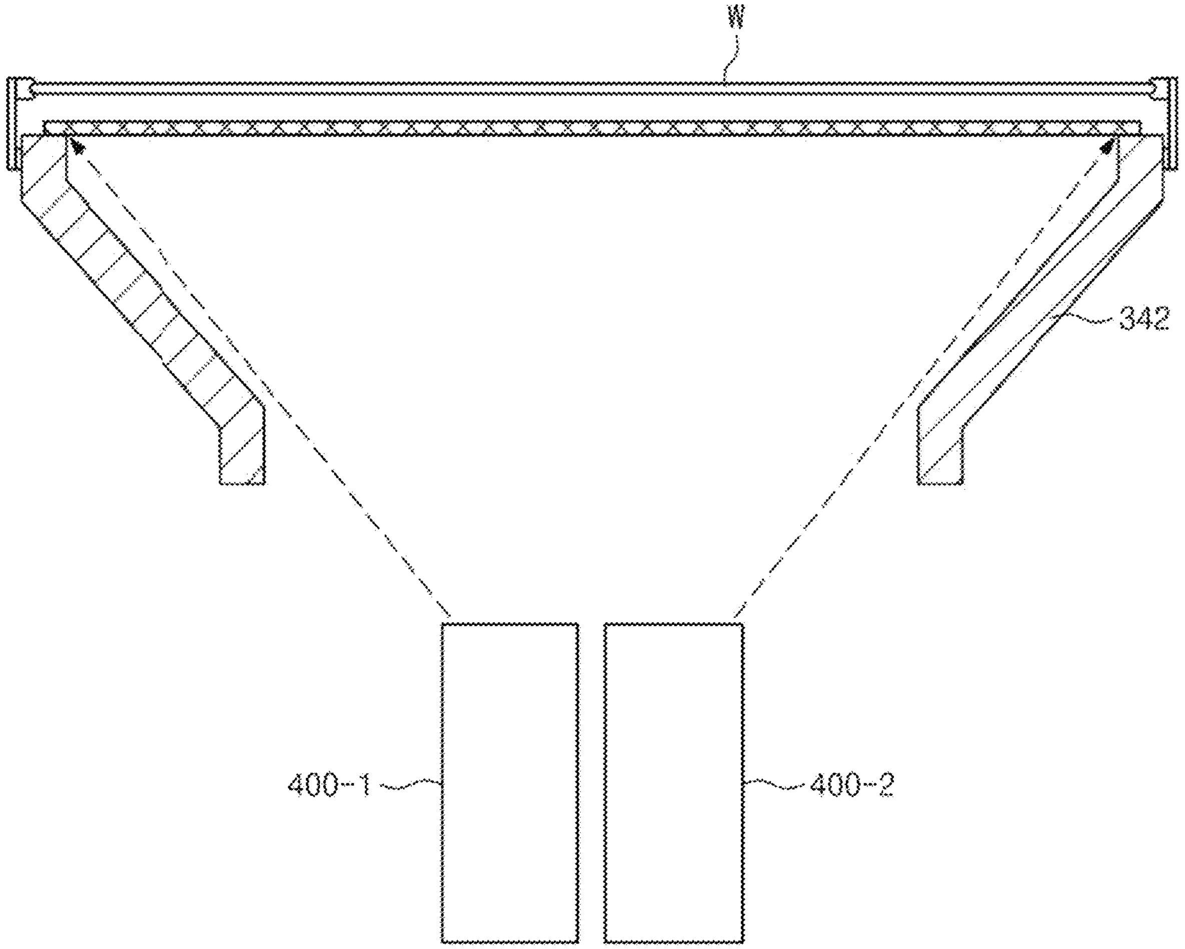
FIG. 6 is a diagram schematically illustrating a method of treating a substrate by applying a microwave applying member 1400 according to a second embodiment of the present invention.

FIG. 6 is a diagram schematically illustrating a method of treating a substrate by applying a microwave applying member 1400 according to a second embodiment of the present invention. According to the second embodiment, the microwave applying member 1400 applies a plurality of microwaves.

In one example, the microwave applying member 1400 includes a first microwave applying member 400-1 and a second microwave applying member 400-2. The first microwave applying member 400-1 and the second microwave applying member 400-2 emit different microwaves, respectively. The first microwave applying member 400-1 is connected to the first magnetron, and the second microwave applying member 400-2 is connected to the second magnetron. For convenience, the microwave emitted by the first microwave applying member 400-1 is referred to as a first microwave, and the microwave emitted by the second microwave applying member 400-2 is referred to as a second microwave. The first microwave and the second microwave are combined with each other and transmitted to the substrate W.

Figure 7:
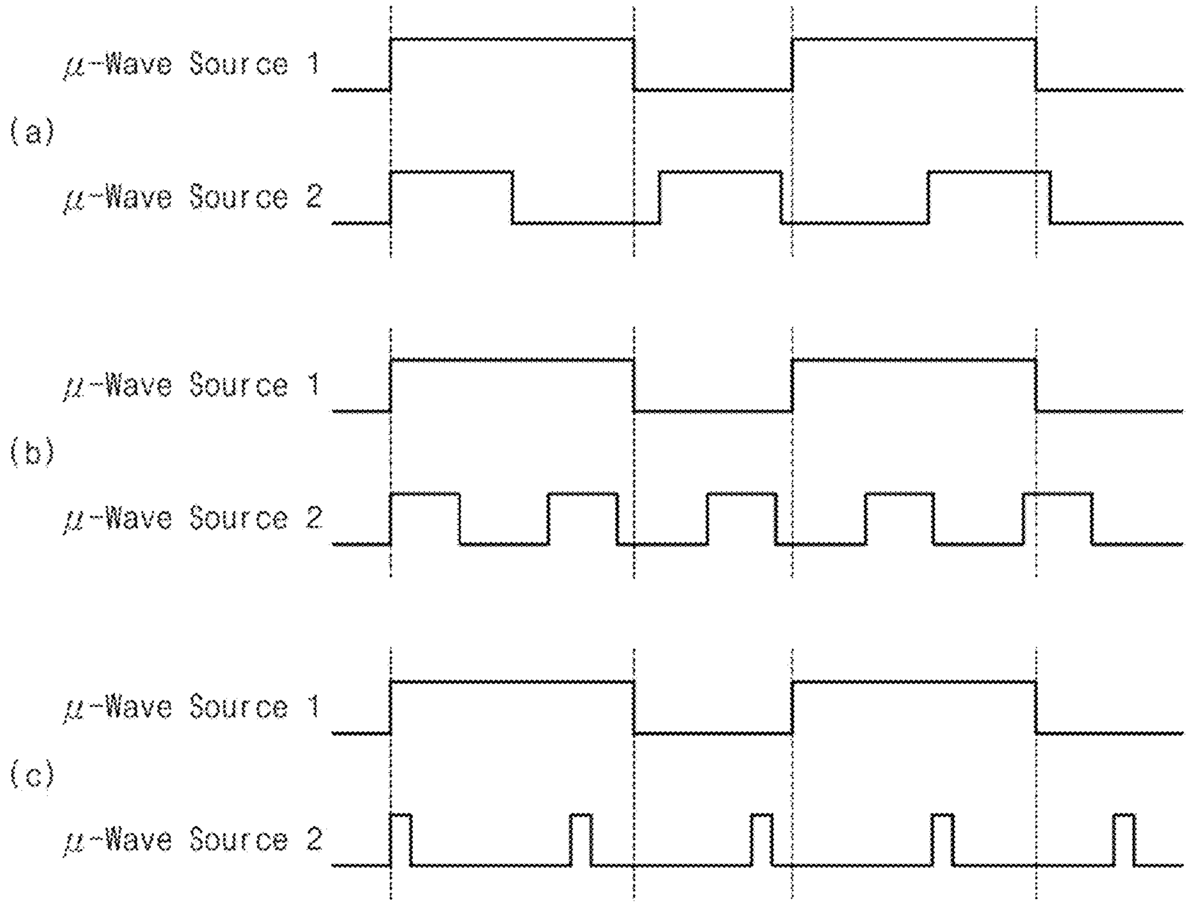
FIG. 7 is a graph illustrating a combination example of a first microwave and a second microwave emitted from the microwave applying member 1400 according to the second embodiment of the present invention.

FIG. 7 is a graph illustrating a combination example of the first microwave and the second microwave emitted from the microwave applying member 1400 according to the second embodiment of the present invention.

(a) of FIG. 7 is a first combination example, (b) of FIG. 7 is a second combination example, and (c) of FIG. 7 is a third combination example. The first microwave emitted from the first magnetron (μ-Wave Source 1) and the second microwave emitted from the second magnetron (μ-Wave Source 2) may have different in one or more of a pulse width, intensity, and a duty ratio. The combination of the first microwave and the second microwave may be different depending on the film quality of the substrate W to be treated. Any one or more of a pulse width, intensity, and a duty ratio of the first microwave and the second microwave may vary according to time. According to the embodiment, it is possible to obtain a selective heating effect on the film quality through frequency modulation of 10% or more. For example, the substrate W is heated by using high μ-Wave (higher frequency microwave) when the thickness of the film deposited on the substrate W is 500 nm or less, and the substrate W is heated by using low μ-Wave (lower frequency microwave) when the thickness of the film deposited on the substrate W is 500 nm or more, thereby minimizing damage to the substrate W.

In addition, the reflected wave is controlled by adjusting the phase difference of the microwave. For example, by controlling the phase difference of microwaves to control the overlapping phenomenon of the traveling wave and the reflected wave, the entire surface of the substrate may be uniformly heated (heating uniformity may be increased).

Figure 8:
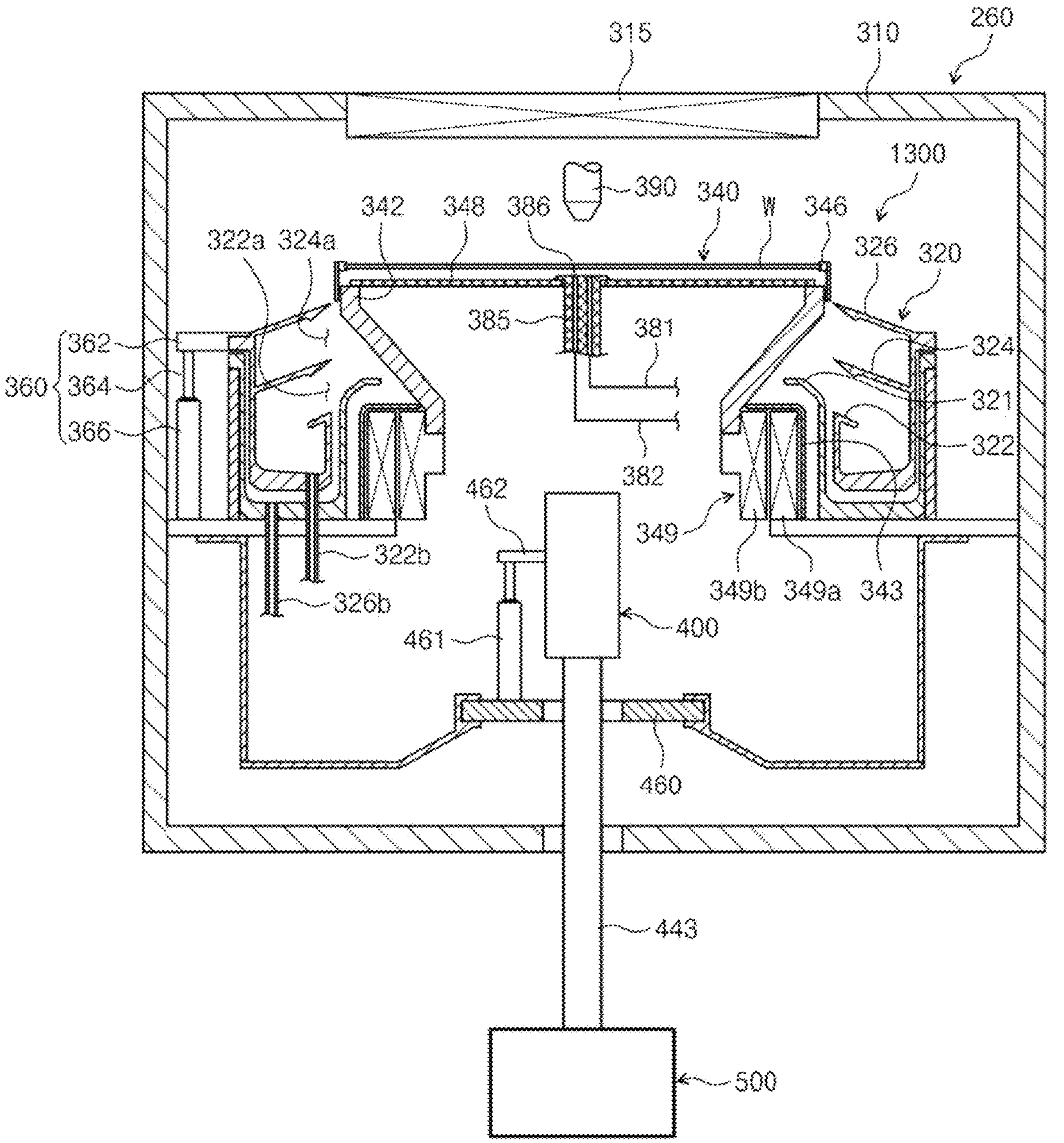
FIG. 8 is a cross-sectional view illustrating a substrate treating apparatus 1300 according to a second embodiment provided in the process chamber 260 of FIG. 1.

FIG. 8 is a cross-sectional view illustrating a substrate treating apparatus 1300 according to a second embodiment provided in the process chamber 260 of FIG. 1. This will be described with reference to FIG. 8. In describing the substrate treating apparatus 1300 according to the second embodiment, the same configuration as that of the substrate treating apparatus 300 of the first embodiment with reference to FIG. 2 will be replaced with the description of the first embodiment.

The substrate treating apparatus 1300 is provided with a back nozzle 386. The back nozzle 386 is located inside the spin housing 342 and includes a tube body 385 passing through the window member 348. The tube body 385 may be made of a material having high microwave permeability. Accordingly, the microwave transmitted to the substrate W may be transmitted without being interfered with by the tube body 385. The tube body 385 may be made of a material having high corrosion resistance so as not to react with the fluid being transferred. In addition, the tube body 385 may be made of a material having high corrosion resistance so as not to react with the fluid that is supplied to the substrate W and scattered. For this purpose, the material of the tube body 385 may be, for example, quartz, glass, or sapphire. A flow path formed by the tube body 385 may be connected to a first supply line 381 for transmitting a first fluid. The flow path formed by the tube body 385 may be connected to a second supply line 381 for transmitting a second fluid. The first fluid may be pure water. The second fluid may be nitrogen.

The foregoing detailed description illustrates the present invention. Further, the above content illustrates and describes the exemplary embodiment of the present invention, and the present invention can be used in various other combinations, modifications, and environments. That is, the foregoing content may be modified or corrected within the scope of the concept of the invention disclosed in the present specification, the scope equivalent to that of the disclosure, and/or the scope of the skill or knowledge in the art. The foregoing exemplary embodiment describes the best state for implementing the technical spirit of the present invention, and various changes required in specific application fields and uses of the present invention are possible. Accordingly, the detailed description of the invention above is not intended to limit the invention to the disclosed exemplary embodiment. In addition, the appended claims should be construed to include other embodiments as well.

The invention claimed is:

1. An apparatus configured to treat a substrate, the apparatus comprising:
- a chamber defining a processing space;
- a substrate support in the processing space and configured to support a substrate and rotate the substrate;
- a liquid supply including a chemical liquid discharge nozzle configured to discharge a chemical liquid to the substrate supported by the substrate support; and
- a microwave emitter configured to emit microwaves to the substrate,
- the substrate support including
  - a window made from a layer of material that is horizontally oriented, the window being configured to allow a laser beam emitted from a laser beam emitter to be transmitted to a bottom surface of the substrate;
  - a chuck pin configured to support a side portion of the substrate, the chuck pin being configured to space apart the window and the substrate;
  - a spin housing coupled to the window, the spin housing defining a vertical path configured to guide the laser beam; and
  - a driver configured to rotate the spin housing, and
  - the microwave emitter being under the window.

2. The apparatus of claim 1, further comprising:
- a back nozzle traverses through the window,
- wherein the back nozzle is a dielectric.

3. The apparatus of claim 1, wherein the microwave emitter is configured to emit a first microwave and a second microwave different from the first microwave.

4. The apparatus of claim 3, wherein the first microwave and the second microwave are different due to a difference in at least one parameter that includes one or more of a pulse width, an intensity, and a duty ratio.

5. The apparatus of claim 4, wherein the at least one parameter depends on a type of film quality.

6. The apparatus of claim 3, wherein the second microwave offsets an overlapping phenomenon of a traveling wave that the first microwave reaches the substrate and a reflected wave.

7. The apparatus of claim 1, wherein the microwave emitter is under the substrate.

8. The apparatus of claim 1, wherein the chemical liquid is an aqueous solution of phosphoric acid.

9. The apparatus of claim 1, further comprising:

a controller, wherein the controller is configured to control the substrate support and the liquid supply to form a liquid film of the chemical liquid on an upper surface of the substrate while rotating the substrate, and applying the microwaves to the substrate through the microwave emitter.

10. An apparatus for treating a substrate, the apparatus comprising:

a chamber defining a processing space;

a substrate support in the processing space and configured to support a substrate and rotate the substrate;

a liquid supply including a chemical liquid discharge nozzle configured to discharge a chemical liquid to the substrate supported by the substrate support; and a microwave emitter configured to emit microwaves to the substrate, wherein the substrate support including a window made from a layer of material that is horizontally oriented, the window being configured to allow a laser beam emitted from a laser beam emitter to be transmitted to a bottom surface of the substrate, the layer of material including a dielectric material;

a chuck pin configured to support a side portion of the substrate, the chuck pin being configured to spaced apart the window and the substrate;

a spin housing coupled to the window, the spin housing defining a vertical path configured to guide the laser beam; and a driver configured to rotate the spin housing, the microwave emitter being under the window, and the microwaves being different depending on a type of membrane quality.

* * * * *